United States Patent [19]

Ohtsubo

[11] 4,373,790
[45] Feb. 15, 1983

[54] CAMERA HAVING A FLASHLIGHT PHOTOGRAPHY RECOMMENDATION DEVICE

[75] Inventor: Yoshiaki Ohtsubo, Kawasaki, Japan

[73] Assignee: Nippon Kogaku K.K., Tokyo, Japan

[21] Appl. No.: 281,180

[22] Filed: Jul. 7, 1981

[30] Foreign Application Priority Data

Jul. 30, 1980 [JP] Japan ............................... 55-103692

[51] Int. Cl.³ ..................... G03B 7/00; G03B 15/02
[52] U.S. Cl. ........................... 354/24; 354/31; 354/127
[58] Field of Search ............ 354/24, 31, 32, 60 E, 354/127

[56] References Cited

U.S. PATENT DOCUMENTS 4,285,584 8/1881 Canter ................................. 354/31
4,309,091 1/1982 Fukuhara et al. ................... 354/31

*Primary Examiner*—Michael L. Gellner
*Attorney, Agent, or Firm*—Fitzpatrick, Cella, Harper & Scinto

[57] ABSTRACT

In a camera wherein an object field is divided into a plurality of areas and the brightness of the object in each of the areas is measured to thereby obtain a plurality of measurement values, a device for recommending auxiliary illumination of the object includes means for detecting a maximum value and a minimum value from among the plurality of measurement values, first judgment means for comparing the maximum value and the minimum value and putting out a first judgment signal when the difference between the maximum value and the minimum value exceeds a predetermined value, second judgment means for calculating the mean value of the plurality of measurement values and putting out a second judgment signal when the mean value exceeds a reference value, and means responsive to the first and second judgment signals to indicate the recommendation of the auxiliary illumination.

5 Claims, 6 Drawing Figures

CAMERA HAVING A FLASHLIGHT PHOTOGRAPHY RECOMMENDATION DEVICE

BACKGROUND OF THE INVENTION

1. Field of the Invention

This invention relates to a camera having a device for recommending flashlight photography, and more particularly to a camera having a device for indicating the necessity of flashlight photography during daytime photography.

2. Description of the Prior Art

In case of photography in the daytime or in a place having a quantity of light equivalent to that of the daytime, if a major object to be photographed lies in counter-light or at a somewhat shadowed location, the degree of darkness of the major object is great relative to the bright background and it is necessary to cover the under-exposure of the shadowed portion of the major object by an auxiliary illumination such as a flash device or the like. In such a case, however, skill has been required in judging whether flashlight photography or natural light photography under automatic exposure control should be effected and such judgement has been difficult to beginners.

SUMMARY OF THE INVENTION

It is an object of the present invention to provide a device for indicating the necessity of auxiliary illumination during the photographing of a dark object lying in a bright background.

The device of the present invention is provided in a camera wherein an object field is divided into a plurality of areas and the brightness of the object field in each of these areas is measured to obtain a plurality of measurement values, and the device includes means for detecting a maximum value and a minimum value from among said plurality of measurement values, means for judging abnormality of the brightness distribution of the object field from the difference between the maximum value and the minimum value, means for judging the brightness of the entire object field from the mean value of said plurality of measurement values, and means for indicating recommendation of auxiliary illumination to the object field in response to the result of said two judgment means.

In a preferred embodiment, the judgment of abnormality of the brightness distribution of the object field is effected by calculating the ratio of the maximum measurement value to the minimum measurement value and comparing the calculated value with a predetermined value.

Also, it is preferable in simplifying the device that the judgment of the brightness of the entire object field be effected by approximating it by the mean value of the maximum measurement value and the minimum measurement value and comparing it with a reference value.

The invention will become more fully apparent from the following detailed description thereof taken in conjunction with the accompanying drawings.

DESCRIPTION OF THE PREFERRED EMBODIMENTS

Figure 1:
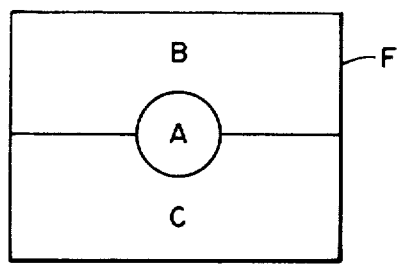
FIGS. 1 and 2 illustrate the manners in which the object field is divided.
Figure 2:
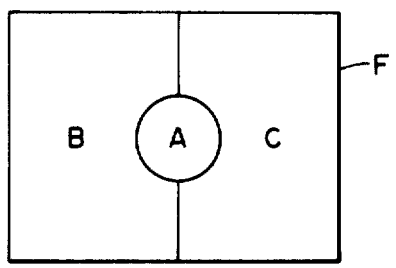

Referring to FIGS. 1 and 2, there are shown examples of the object field division. In FIG. 1, the object field F is divided into three areas, i.e. a central area A, an upper area B and a lower area C, and in FIG. 2, the object field F is divided into three areas, i.e., a central area A, a left area B and a right area C. The brightness of each area of the object field can be individually measured by a metering device comprising a plurality of light-receiving elements provided in the imaging plane of the objective lens of a camera, not shown, or in the viewfinger optical system of the camera.

Figure 3:
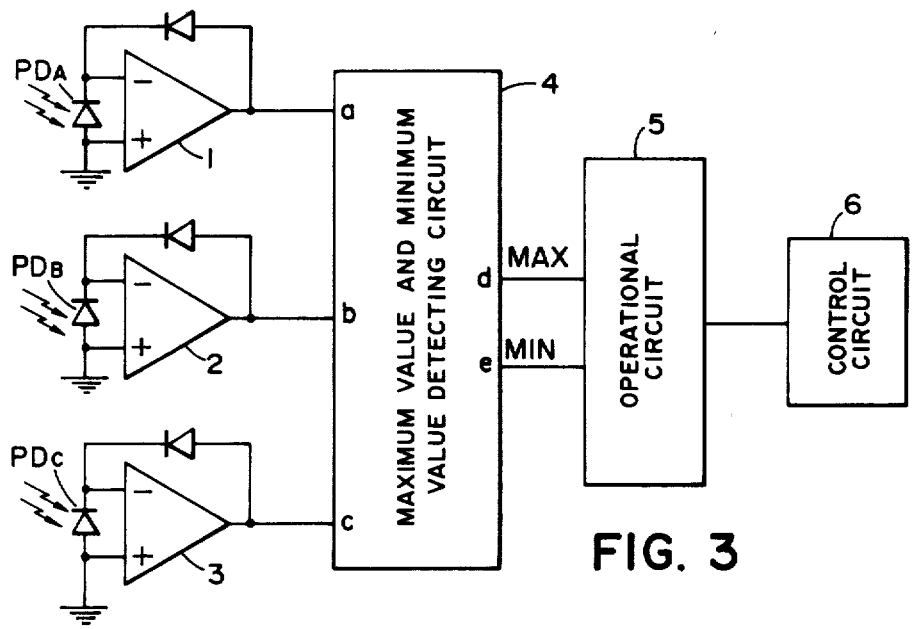
FIG. 3 is a block diagram showing the construction of an embodiment of the present invention.

The lights from the object field corresponding to the areas A, B and C enter light-receiving elements PDA, PDB and PDC shown in FIG. 3. The brightness of the three areas A, B and C are metered by metering amplifiers 1–3 (in this case, they are logarithmically compressed) and are input to a maximum value and minimum value detecting circuit 4. The detecting circuit 4 detects a maximum output and a minimum output from among the outputs of the metering amplifiers 1, 2 and 3 corresponding to the three areas A, B and C and applies them to an operational circuit 5. The operational circuit 5 obtains, from the detected maximum output and minimum output, the ratio of the maximum value to the minimum value of the brightness of each area and the mean value of the maximum value and the minimum value, and applies the output thereof to a control circuit 6. The control circuit 6 effects a flash device use recommendation indication when the ratio of the maximum value to the minimum value, namely, the ratio of the portion of the highest brightness to the portion of the lowest brightness, is greater than a predetermined value (that is, the case of an object in which the difference between the light portion and the dark portion is great) and the mean value of the maximum value and the minimum value is greater than a predetermined value (that is, approximately the case of an object having a brightness which does not require the illumination thereof as the average brightness).

Figure 4:
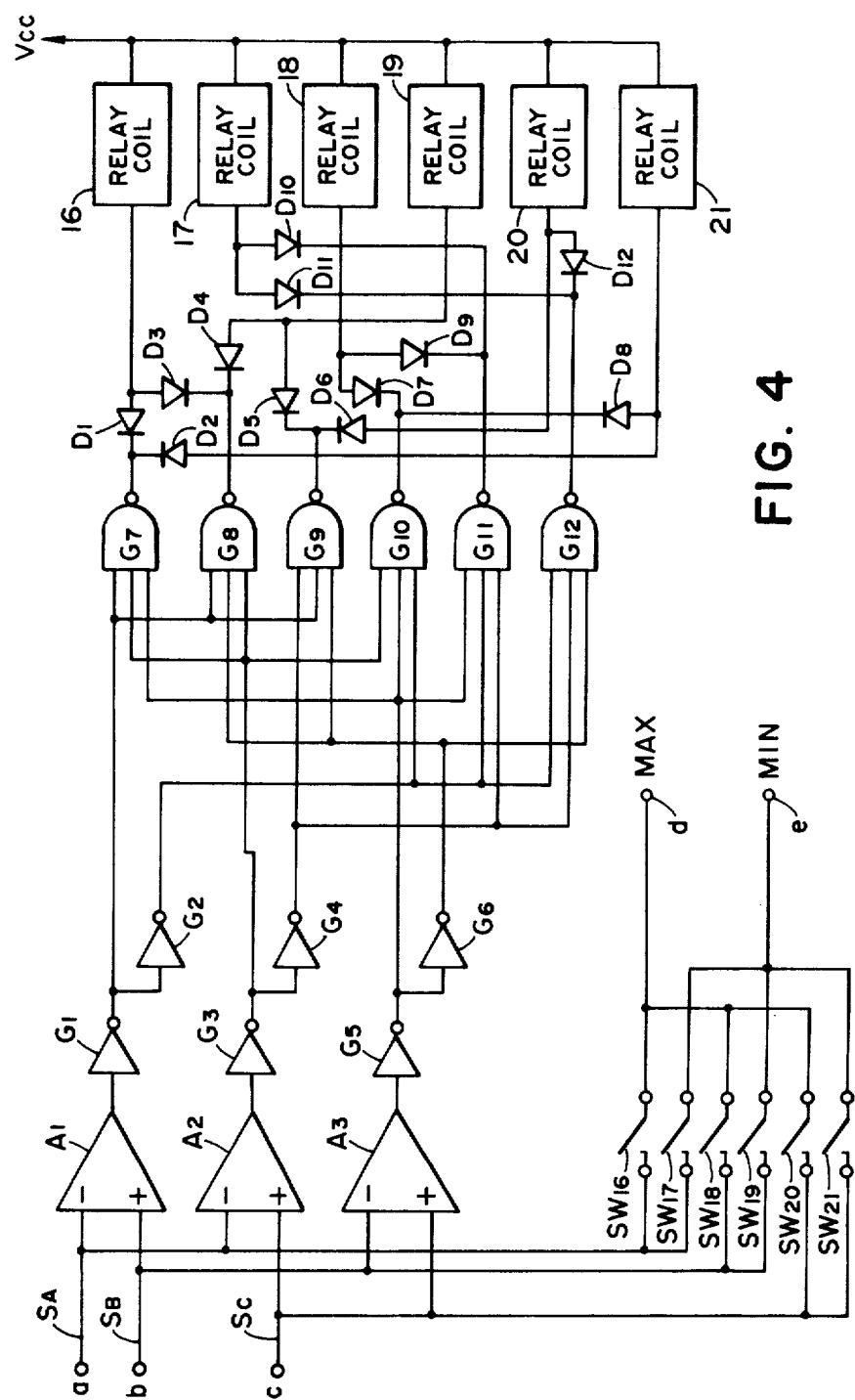
FIG. 4 is a circuit diagram showing a specific example of the maximum value and minimum value detecting circuit of FIG. 3.

FIG. 4 shows an actual example of the maximum value and minimum value detecting circuit 4.

Description will now be made of a case where the object area A of FIG. 1 or 2 has a minimum brightness and the object area B has a maximum brightness. This is, for example, a case where an object in counter-light is to be photographed. At this time, the output voltages $S_A$, $S_B$ and $S_C$ of the metering amplifiers 1-3 are in the relation that $S_B > S_C > S_A$. The voltages $S_A$–$S_C$ are input to comparators $A_1$–$A_3$, where the magnitudes of these voltages are compared. Since the two input of the comparators $A_1$ are $S_B > S_A$, the output of the comparator $A_1$ assumes high level, the output of the comparator $A_2$ similarly assumes high level, and the output of the comparator $A_3$ assumes low level. The outputs of these comparators are applied to NAND gates $G_7$–$G_{12}$ via inverters $G_1$–$G_6$ and through the lines of FIG. 4. At this time, only at the NAND gate $G_{11}$, all inputs are at high level and the output thereof assumes low level. The outputs of the other NAND gates are all at high level. Relay coils 16-21 are connected to the outputs of the NAND gates $G_7$-$G_{12}$ through diodes $D_1$-$D_{12}$ having their cathodes connected to the outputs of the NAND gates, and the relay coils 16-21 are also connected to a voltage source Vcc. The relay coils 16-21 may be electrically energized to close corresponding ones of relay switches $SW_{16}$-$SW_{21}$. Since the output of the NAND gate $G_{11}$ is at low level, the diodes $D_9$ and $D_{10}$ are turned on and therefore, power is supplied to the relay coils 17 and 18. The other diodes having their cathodes connected to the other NAND gates than the NAND gate $G_{11}$ are all OFF. By the power supply to the relay coils 17 and 18, the switches $SW_{17}$ and $SW_{18}$ are closed. Accordingly, a maximum value output terminal d puts out a voltage $S_B$ and a minimum value output terminal e puts out a voltage $S_A$.

The circuit of FIG. 4 is designed such that whatever brightness distribution the objct field may have, the output only of any one of the NAND gates $G_7$-$G_{12}$ assumes low level, and two diodes having their cathodes connected to that NAND gate are turned on to electrically energize two relay coils and close two of the relay switches $SW_{16}$-$SW_{21}$. Operations corresponding to the object field brightness distributions will be shown in the table below.

| Object field brightness distributions | | | |
|---|---|---|---|
| area of maximum brightness | area of minimum brightness | NAND gates whose outputs assume low level | Relay switches closed |
| A | C | $G_7$ | 22, 27 |
| A | B | $G_8$ | 22, 25 |
| C | B | $G_9$ | 26, 25 |
| B | C | $G_{10}$ | 24, 27 |
| B | A | $G_{11}$ | 24, 23 |
| C | A | $G_{12}$ | 26, 23 |

Figure 5:
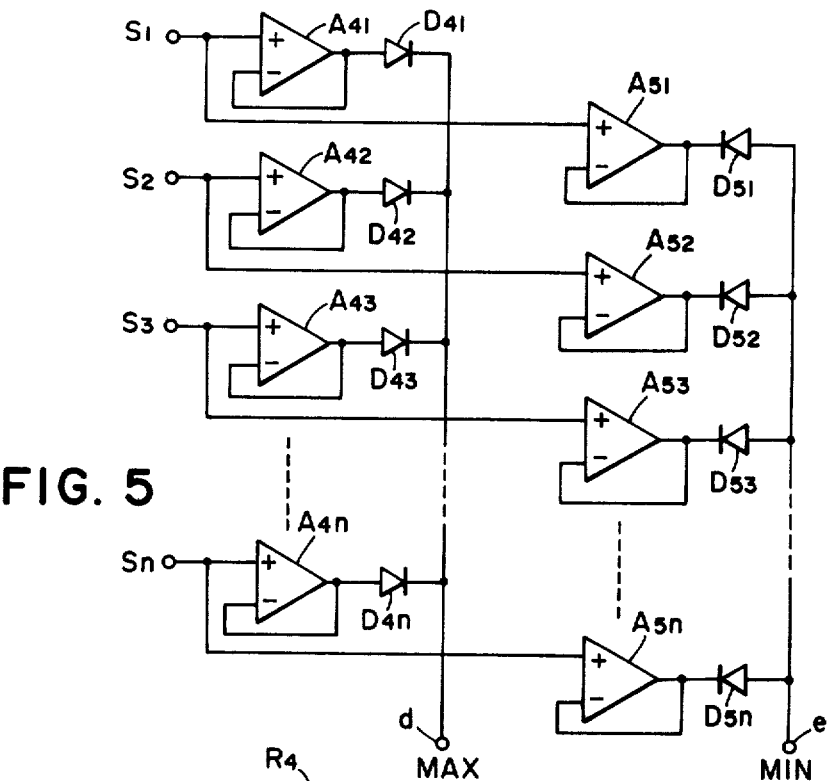
FIG. 5 is a circuit diagram showing another specific example of the maximum value and minimum value detecting circuit of FIG. 3.

The relay switches 22-27 may be replaced by semiconductor switches and in that case, design is made such that the diode matrix switches the semiconductor switches equivalently to the embodiment.

Where the metering input voltage is of three or more values, $$\sum_{m=1}^{m=n} (n-m)$$

comparators may be used for the metering input voltage n values and logic may be set up similarly to the case of the metering input voltage three values. For example, when the metering input is of four values, detection of the maximum and minimum values becomes possible by six comparators, and when the metering input is of five values, detection of the maximum and minimum values becomes possible by ten comparators. Alternatively, although the analog accuracy is aggravated a little, there is a known circuit as shown in FIG. 5 to simply detect the maximum and minimum values. In this circuit, the metering outputs $S_1$-$S_n$ of the object field sections are input to buffer amplifiers $A_{41}$-$A_{4n}$ and $A_{5-1}$-$A_{5n}$. The amplifiers $A_{41}$-$A_{4n}$ are coupled through diodes $D_{41}$-$D_{4n}$, and the amplifiers $A_{51}$-$A_{5n}$ are coupled through diodes $D_{51}$-$D_{5n}$. In the group of diodes $D_{41}$-$D_{4n}$ having their anodes connected to the amplifier outputs, only the diode connected to the amplifier having a maximum output voltage is turned on to put out an output from the terminal d with that output as the maximum value. In the group of diodes $D_{51}$-$D_{5n}$ having their cathodes connected to the amplifier outputs, only the diode connected to the amplifier having a minimum output voltage is turned on to put out an output from the terminal e with that output as the minimum value.

Figure 6:
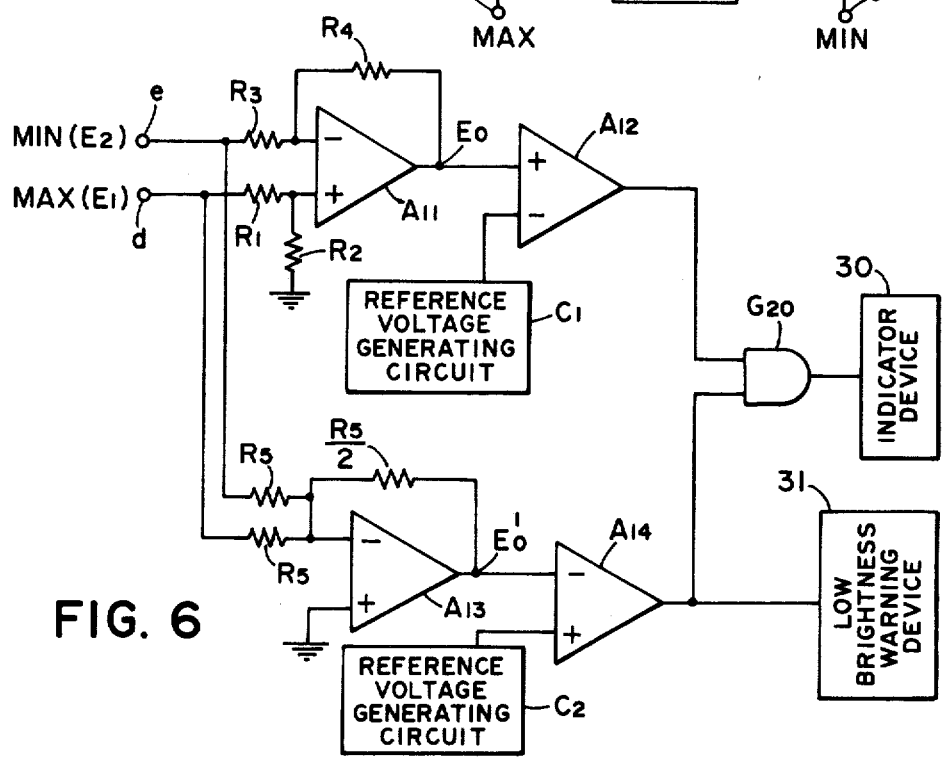
FIG. 6 is a circuit diagram showing specific examples of the operational circuit and the control circuit of FIG. 3.

FIG. 6 shows a specific example of the operational circuit 5 and the control circuit 6. As shown in FIG. 3, the metering amplifiers 1-3 are logarithmic amplifiers and therefore, the metering output is in a logarithmically compressed form. Accordingly, to obtain the ratio of the maximum value to the minimum value of the brightness of each area, the difference between the logarithmic values thereof may be obtained.

In FIG. 6, the maximum value from the output terminal d of the detecting circuit 4 and the minimum value from the output terminal e are input to a differential amplifier $A_{11}$ through resistors R1 and R3, respectively. Assuming that the voltage representing the maximum value is $E_1$ and the voltage representing the minimum value is $E_2$, the output voltage $E_0$ of the differential amplifier $A_{11}$ is $$E_0 = \frac{R_2}{R_1 + R_2}\left(1 + \frac{R_4}{R_3}\right) E_1 - \frac{R_4}{R_3} E_2$$

If, here, the values of $R_1$-$R_4$ are set so that $$\frac{R_2}{R_1 + R_2}\left(1 + \frac{R_4}{R_3}\right) = \frac{R_4}{R_3} = 1, \text{ then } E_0 = E_1 - E_2$$

is the ratio of the maximum brightness to the minimum brightness. The output voltage $E_0$ of the differential amplifier $A_{11}$ is input to one terminal of a comparator $A_{12}$ and compared with the output voltage of a reference voltage generating circuit $C_1$. The output voltage of the circuit $C_1$ is set to the value of critical $E_0$ whereat the difference between the maximum brightness and the minimum brightness of each area of the divided object is so great that a good photograph cannot be obtained without auxiliary illumination. This voltage value can be empirically obtained in advance. The comparator $A_{12}$ detects when the ratio $E_0$ of the maximum brightness and the minimum brightness is greater than said reference voltage, and renders the output voltage into high level. This is a first judgment output for recommendation of the use of a flash device. Further, to obtain an approximate average brightness of the object field, the maximum value and the minimum value are input to a mean value amplifier $A_{13}$ to which are connected two resistors $R_5$, $R_5$ having the same resistance value and a resistor R5/2 having one half of the resistance value of R5. Accordingly, the output voltage $E_{0'}$ of the amplifier $A_{13}$ becomes $E_{0'} = -\frac{1}{2}(E_1 + E_2)$ and there is obtained an inverted mean value. The output voltage $E_{0'}$ of the mean value amplifier $A_{13}$ is input to one terminal of a comparator $A_{14}$ and compared with the output voltage of a reference voltage generating circuit $C_2$. The output voltage of the circuit $C_2$ is set to the value of critical $E_{0'}$ whereat the average brightness of the object field is so much reduced that a good photograph cannot be obtained without auxiliary illumination. This voltage value may be made into a metering output voltage value for an object field of a critical brightness for which proper exposure can no longer be obtained within the range of combination of an aperture value controllable by the exposure control device of the camera and a shutter speed faster than the limit which may cause hand vibration during photography.

A comparator $A_{14}$ renders its output voltage into high level if the mean value $E_0$ is lower than the reference voltage of the circuit $C_2$. This is a second judgment output for recommendation of the use of a flash device. An AND circuit $G_{20}$ produces a high level output only when both of the outputs of the comparators $A_{12}$ and $A_{14}$ are at high level, namely, when the ratio of the maximum brightness to the minimum brightness is greater than a predetermined value and the average brightness is not so low that auxiliary illumination is required, and drives an indicator device 30 which indicates the recommendation of the use of a flash device.

In the present embodiment, the mean value amplifier $A_{13}$ is formed by a standard mean value operating circuit and therefore an inverted output is obtained and accordingly, it is necessary that the output voltage of the reference voltage generating circuit $C_2$ be rendered into a negative voltage, but actually, the circuit can be simply constructed even by a single power source if a positive bias at the non-inverting input voltage of the amplifier $A_{13}$ is applied or a conventional circuit for obtaining the mean value through a resistance voltage division is used.

Further, if the output of the comparator $A_{14}$ is input to a low brightness warning device 31 which indicates and warns that the average brightness of the object is low, normal low brightness warning can be made instead of the recommendation of the use of a flash device in the daytime. The indicator device 30 and the low brightness warning device 31 need not particularly be constituted by separate devices but may also be designed to effect indication by the same indicating element with the indication system thereof changed.

I claim:

1. In a camera wherein an object field is divided into a plurality of areas and the brightness of the object field in each of said areas is measured to thereby obtain a plurality of measurement values, a device for recommending auxiliary illumination of the object field, said device including:

(a) means (4) for detecting a maximum value and a minimum value from among said plurality of measurement values;
   (b) first judgment means for comparing said maximum value and said minimum value and putting out a first judgment signal when the difference between said maximum value and said minimum value exceeds a predetermined value;
   (c) second judgment means for calculating the mean value of said plurality of measurement values and putting out a second judgment signal when said mean value exceeds a reference value; and
   (d) means responsive to said first judgment signal and said second judgment signal to indicate the recommendation of said auxiliary illumination.

2. A camera according to claim 1, wherein said first judgment means includes:
   (a) means ($A_{11}$) for calculating the ratio of said maximum value to said minimum value and putting out it as an electrical signal;
   (b) means ($C_1$) for generating an electrical signal corresponding to said predetermined value; and
   (c) means ($A_{12}$) for comparing said two electrical signals.

3. A camera according to claim 1, wherein said second judgment means includes:
   (a) means ($A_{13}$) for calculating the mean value of said maximum value and said minimum value and putting out it as an electrical signal;
   (b) means ($C_2$) for generating an electrical signal corresponding to said reference value; and
   (c) means for comparing said two electrical signals.

4. A camera according to claim 1, wherein said device includes a plurality of photoelectric conversion elements capable of receiving the light beams from said plurality of areas, and means for generating a plurality of metering outputs resulting from logarithmically converting the outputs of said elements, and said first judgment means includes means ($A_{11}$) for calculating the difference between the maximum output and the minimum output of said metering outputs and putting out it as an electrical signal, means ($C_1$) for generating an electrical signal corresponding to said predetermined value, and means ($A_{12}$) for comparing said two electrical signals.

5. A camera according to claim 1, wherein said device further includes means capable of indicating the recommendation of said auxiliary illumination separately from said means responsive to said second judgment signal to indicate said recommendation.

* * * * *